(12) United States Patent
Fracchia (10) Patent No.: US 11,858,348 B2
(45) Date of Patent: Jan. 2, 2024

(54) CONTROLLER FOR VEHICLE DISPLAY SYSTEM

(71) Applicant: JAGUAR LAND ROVER LIMITED, Coventry (GB)

(72) Inventor: Riccardo Fracchia, Warwickshire (GB)

( * ) Notice: Subject to any disclaimer, the term of this patent is extended or adjusted under 35 U.S.C. 154(b) by 799 days.

(21) Appl. No.: 16/971,245

(22) PCT Filed: Feb. 13, 2019

(86) PCT No.: PCT/EP2019/053485
§ 371 (c)(1),
(2) Date: Aug. 19, 2020

(87) PCT Pub. No.: WO2019/162151
PCT Pub. Date: Aug. 29, 2019

(65) Prior Publication Data
US 2020/0384862 A1    Dec. 10, 2020

(30) Foreign Application Priority Data

Feb. 26, 2018    (GB) .................................... 1803053
Feb. 26, 2018    (GB) .................................... 1803055

(51) Int. Cl.
*B60K 35/00*    (2006.01)
*B60K 37/06*    (2006.01)

(52) U.S. Cl.
CPC .............. *B60K 35/00* (2013.01); *B60K 37/06* (2013.01); *B60K 2370/11* (2019.05);
(Continued)

(58) Field of Classification Search
None
See application file for complete search history.

(56) References Cited

U.S. PATENT DOCUMENTS

| | | | |
|---|---|---|---|
| 8,653,960 B2* | 2/2014 | Hanna .................... | B60W 10/26 340/455 |
| 2004/0128047 A1* | 7/2004 | Graves .................. | B60W 10/04 701/54 |

(Continued)

FOREIGN PATENT DOCUMENTS

| | | |
|---|---|---|
| EP | 1621438 A2 | 2/2006 |
| EP | 3031661 A1 | 6/2016 |

(Continued)

OTHER PUBLICATIONS

European Patent Office, Office Action Issued in Application No. 19707359.6, dated Dec. 19, 2022, Germany, 5 pages.

(Continued)

*Primary Examiner* — Daniel L Greene
(74) *Attorney, Agent, or Firm* — McCoy Russell LLP (57) ABSTRACT

A vehicle display system is configured to display instantaneous power delivery of a powertrain of the vehicle as a proportion of the instantaneous power capability of the powertrain. A controller for the vehicle display system comprises an input configured to receive data relating to a condition indicative of a limitation on the instantaneous power delivery and/or power capability, a processor configured to determine from the data whether the condition meets at least one predetermined criterion and an output configured to output a signal to display the limitation in relation to the instantaneous power capability of the powertrain when the condition meets the at least one predetermined criterion.

20 Claims, 6 Drawing Sheets

(52) U.S. Cl.
CPC .. *B60K 2370/152* (2019.05); *B60K 2370/167* (2019.05); *B60K 2370/52* (2019.05)

(56) References Cited

U.S. PATENT DOCUMENTS

| | | | |
|---|---|---|---|
| 2009/0243827 A1 | 10/2009 | Burke et al. | |
| 2010/0198449 A1 | 8/2010 | Ueoka et al. | |
| 2011/0023772 A1* | 2/2011 | Crombez | B60L 7/18 |
| | | | 116/28 R |
| 2011/0125357 A1* | 5/2011 | Harumoto | B60W 20/00 |
| | | | 903/902 |
| 2011/0320088 A1* | 12/2011 | Eom | B60K 35/00 |
| | | | 340/455 |
| 2014/0021898 A1* | 1/2014 | Hendrickson | H02P 29/028 |
| | | | 318/434 |
| 2014/0156105 A1 | 6/2014 | Faivre et al. | |
| 2014/0156162 A1 | 6/2014 | Faivre et al. | |
| 2014/0368328 A1* | 12/2014 | Choi | B60K 35/00 |
| | | | 340/461 |
| 2015/0100226 A1* | 4/2015 | Skaff | B60W 50/14 |
| | | | 701/123 |
| 2015/0367731 A1 | 12/2015 | Amano et al. | |
| 2016/0049023 A1* | 2/2016 | Stinchcombe | B60K 6/52 |
| | | | 701/115 |
| 2018/0334034 A1* | 11/2018 | Okuji | G08B 1/02 |

FOREIGN PATENT DOCUMENTS

| | | |
|---|---|---|
| FR | 2882699 A1 | 9/2006 |
| FR | 2922825 A1 | 5/2009 |
| WO | 2013160014 A1 | 10/2013 |

OTHER PUBLICATIONS

International Search Report and Written Opinion, PCT/EP2019/053485, dated May 15, 2019.
Combined Search and Examination Report, GB1803053.6, dated Aug. 13, 2018.

* cited by examiner

CONTROLLER FOR VEHICLE DISPLAY SYSTEM

CROSS-REFERENCE TO RELATED APPLICATIONS

This application is a 371 of International Application No. PCT/EP2019/053485, filed Feb. 13, 2019, which claims priority to GB Patent Application 1803053.6, filed Feb. 26, 2018 and GB Patent Application 1803055.1, filed Feb. 26, 2018, the contents of which are incorporated by reference herein in their entirety.

TECHNICAL FIELD

The present disclosure relates to a controller for a vehicle display system. In particular, but not exclusively, the present disclosure relates to a controller for a vehicle display system, the display system configured to display instantaneous power delivery of a powertrain of the vehicle as a proportion of the instantaneous power capability of the powertrain and particularly, but not exclusively, to a controller for detecting if one or more powertrain limitation meets at least one predetermined criterion. Aspects of the invention relate to a vehicle, a controller, a display system, a computer program, and a method.

BACKGROUND

On electrified vehicles, especially battery electric vehicles, it can be useful to display to the driver an indication of how much of the full powertrain capability is being used to accelerate or decelerate the vehicle. Since the powertrain capability can vary dynamically as a function of the state of the components (such as component temperature, machine rotational speeds and battery state), it can be useful to display to the driver an indication of the instantaneous power delivery of the powertrain expressed as a proportion of the instantaneous capability of the powertrain.

There arises a problem when either an everyday temporary condition or a fault condition causes the availability of power and/or torque of the powertrain to reduce significantly such that the powertrain power indicator would be misleading if it continued the above display strategy.

The present invention has been devised to mitigate or overcome at least some of the above-mentioned problems.

SUMMARY OF THE INVENTION

Aspects and embodiments of the invention relate to a vehicle, a vehicle comprising a display system, a display system, a computer program, a controller and a method of rendering on a vehicle display system the instantaneous power delivery as a proportion of power capability of a vehicle powertrain as claimed in the appended claims.

According to an aspect of the present invention there is provided a controller for a vehicle display system, the display system configured to display instantaneous power delivery of a powertrain of the vehicle as a proportion of the instantaneous power capability of the powertrain. The controller comprises an input configured to receive data relating to a condition indicative of a limitation on the instantaneous power delivery and/or power capability, a processor configured to determine from the data whether the condition meets at least one predetermined criterion and an output configured to output a signal to display the limitation in relation to the instantaneous power capability of the powertrain when the condition meets the at least one predetermined criterion.

The input may be configured to receive data relating to more than one condition indicative of a limitation on the instantaneous power delivery and/or power capability. The processor may be configured to determine from the data whether one or more of the conditions meets at least one respective criterion. The output may be configured to display the limitation when at least one of the conditions meets its respective criterion. Alternatively, the output may be configured to display the limitation only when each condition meets its respective criterion.

The limitation may be a temporary limitation indicative of a fault and/or edge condition of the powertrain, for example failure of an electrical component or extreme temperature conditions.

The predetermined criterion may be a threshold value, determined from the data, under or over which the limitation is displayed.

A processor could also refer to more than one processor configured for this function.

The condition indicative of a limitation may comprise a reduction in available traction power. The reduction in available traction power may be due to a limitation on the discharge capability of a battery of the powertrain, for example due to a fault in one or more electrical components of the powertrain. The one or more electrical components may comprise a bus or connector.

Where the condition comprises a reduction in available traction power, the processor may be configured to determine from the data whether the available traction power is below a predetermined magnitude, the predetermined magnitude representing the criterion under which the limitation is displayed.

Additionally or alternatively, the condition indicative of a limitation may be a reduction in available traction torque from one or more prime-mover of the powertrain, e.g. one or more actuators/electric motors. The processor may be configured to determine whether the available traction torque is below a predetermined magnitude, the predetermined magnitude representing the criterion under which the limitation is displayed. In such embodiments, the predetermined magnitude may be variable in dependence on the instantaneous speed of one or more primer-mover. The speed may be the rotational speed of one or more electric motors, for example.

In embodiments, the power capability of the powertrain may vary in dependence on one or more operating parameters thereof and the display system is configured to display power delivery as a proportion of a range of power capabilities, the predetermined criterion representing when the instantaneous power capability is below the minimum of the range of power capabilities. In this example, the power capability is an effective power capability due to the limitation. The range of power capabilities represents a practical limitation of the power delivery display i.e. the limits between which variation in detected power capabilities is possible. The processor may be configured to determine a ratio of the instantaneous power capability to the minimum of the range of power capabilities and the output is configured to display the ratio.

Embodiments of the invention include a display system for a vehicle, the display system configured to display instantaneous power delivery of a powertrain of the vehicle as a proportion of the instantaneous power capability of the powertrain. The display system comprising a controller as set forth in any of the embodiments described above.

The display system may comprises an indicator to graphically display instantaneous power delivery of the powertrain of the vehicle as a proportion of the instantaneous power capability of the powertrain and wherein the output is configured to add a marker to the indicator indicative of the limitation. The indicator may configured such that it is be visible to the driver of the vehicle.

The indicator may be a gauge or scale having a lower limit representing zero or negligible power delivery and an upper limit representing maximum power delivery equal to the instantaneous power capability and the marker is positioned between the lower and upper limits. The indicator could be a linear, circular or arcuate gauge, for example.

According to a further aspect of the present invention, there is provided a method of rendering on a vehicle display system the instantaneous power delivery as a proportion of power capability of a vehicle powertrain. The method comprises receiving data relating to a condition indicative of a limitation on the instantaneous power delivery and/or power capability, determining from the data whether the condition meets at least one predetermined criterion and rendering the limitation in relation to the instantaneous power capability of the powertrain when the condition meets the at least one predetermined criterion.

The method may comprise receiving data relating to more than one condition indicative of a limitation on the instantaneous power delivery and/or power capability and determining from the data whether one or more of the conditions meets at least one respective criterion. The method may further comprise displaying the limitation when at least one of the conditions meets its respective criterion. Alternatively, the limitation may be displayed only when each condition meets its respective criterion.

The limitation may be a temporary limitation indicative of a fault and/or edge condition of the powertrain, for example failure of an electrical component or extreme temperature conditions.

The predetermined criterion may be a threshold value, determined from the data, under or over which the limitation is displayed.

The method may be a computer implemented method.

The method comprises selectively displaying the limitation, such that the limitation is not necessarily displayed when present, only when the limitation is considered likely to affect operation of the vehicle, for example due to instantaneous vehicle/powertrain operating parameters.

The condition indicative of a limitation may be a reduction in available traction power. A reduction in available traction power may be due to a limitation on the discharge capability of a battery of the powertrain, for example due to a fault in one or more electrical components of the powertrain. The one or more electrical components may comprise a bus or connector.

Where the condition comprises a reduction in available traction power, the predetermined criterion may represent a magnitude of the available traction power below which the limitation is displayed.

Additionally or alternatively, the condition indicative of a limitation is a reduction in available traction torque from one or more prime-mover of the powertrain, e.g. one or more actuators/electric motors. The predetermined criterion may represent a magnitude of the available traction torque below which the limitation is displayed. The predetermined magnitude may vary in dependence on the instantaneous speed of the one or more prime-mover. The speed may be the rotational speed of one or more electric motors, for example.

In embodiments, the power capability of the powertrain varies in dependence on one or more operating parameters thereof and the display system is configured to display power delivery as a proportion of a range of power capabilities, the predetermined criterion representing when the instantaneous power capability is below the minimum of the range of power capabilities. The power capability is an effective power capability due to the limitation. The range of power capabilities represents a practical limitation of the power delivery display i.e. the limits between which variation in detected power capabilities is possible. The method may comprise determining a ratio of the instantaneous power capability to the minimum of the range of power capabilities and displaying the ratio.

In embodiments, the display system comprises an indicator to graphically display instantaneous power delivery of the powertrain of the vehicle as a proportion of the instantaneous power capability of the powertrain and wherein displaying the limitation includes adding a marker to the indicator indicative of the limitation.

The indicator may be a gauge or scale having a lower limit representing zero or negligible power delivery and an upper limit representing maximum power delivery equal to the instantaneous power capability and the marker is positionable between the lower and upper limits.

Embodiments of the invention further include a computer program comprising instructions which, when the program is executed by a computer, cause the computer to carry out the method as described in relation to any of the embodiments described above and a computer-readable data carrier having stored thereon the computer program.

In further embodiments, a vehicle comprises the controller or display system or is configured to perform the method of any of the above-described embodiments. The vehicle may be a battery electric vehicle or hybrid electric vehicle and the powertrain comprises a battery pack and one or more prime-mover, such as an electric motor.

According to an aspect of the present invention there is provided a controller for a vehicle display system, the display system configured to display instantaneous power delivery of a powertrain of the vehicle as a proportion of the instantaneous power capability of the powertrain. The controller comprises an input configured to receive data relating to a condition indicative of a limitation on the instantaneous power delivery and/or power capability, a processor configured to determine from the data whether the condition meets at least one predetermined criterion and an output configured to output a signal to display the limitation in relation to the instantaneous power capability of the powertrain when the condition meets the at least one predetermined criterion.

The input may be configured to receive data relating to more than one condition indicative of a limitation on the instantaneous power delivery and/or power capability. The processor may be configured to determine from the data whether one or more of the conditions meets at least one respective criterion. The output may be configured to display the limitation when at least one of the conditions meets its respective criterion.

Alternatively, the output may be configured to display the limitation only when each condition meets its respective criterion.

The limitation may be a temporary limitation indicative of a fault and/or condition of the powertrain causing the speed of the vehicle to be restricted.

The predetermined criterion may be a threshold value, determined from the data, under or over which the limitation is displayed.

A processor could also refer to more than one processor configured for this function.

The condition indicative of a limitation may be a speed restriction of the vehicle. The speed restriction being a maximum speed over which the vehicle cannot travel, for example for road safety or vehicle operation reasons. The speed restriction may be implemented by a control system of the vehicle such that the driver is unable to draw further power from the power train when the vehicle is approaching the speed limit and/or a braking force is applied. As such, speed restriction limits power delivery such that, under certain circumstances the powertrain is not able to use/reach the full powertrain capability. The speed restriction need not be a constant speed and may vary depending on one or more operating parameters of the vehicle.

Where the condition indicative of a limitation is a speed restriction of the vehicle, the at least one predetermined criterion may be variable with the instantaneous speed of the vehicle. The processor may be configured to determine from the data whether the speed restriction is within a threshold amount of the instantaneous speed of the vehicle. In such embodiments, the input may also be configured to receive data relating to the instantaneous speed of the vehicle.

The speed restriction may vary with time and the output may be configured to display the limitation at a pre-determined level in dependence on the instantaneous speed restriction. In such cases, the predetermined criterion may comprise a threshold speed which is variable with the speed restriction such that the threshold speed increases as the speed restriction increases. Alternatively, the predetermined criterion may comprise a plurality of threshold speeds, and the processor configured to select one of the threshold speeds in dependence on the instantaneous speed restriction.

Embodiments of the invention include a display system for a vehicle, the display system configured to display instantaneous power delivery of a powertrain of the vehicle as a proportion of the instantaneous power capability of the powertrain. The display system comprising a controller as set forth in any of the embodiments described above.

The display system may comprises an indicator to graphically display instantaneous power delivery of the powertrain of the vehicle as a proportion of the instantaneous power capability of the powertrain and wherein the output is configured to add a marker to the indicator indicative of the limitation. The indicator may configured such that it is be visible to the driver of the vehicle.

The indicator may be a gauge or scale having a lower limit representing zero or negligible power delivery and an upper limit representing maximum power delivery equal to the instantaneous power capability and the marker is positioned between the lower and upper limits. The indicator could be a linear, circular or arcuate gauge, for example.

The processor may be configured to determine a power level required to maintain the vehicle at a speed corresponding to the speed restriction and the output may be configured to display the restriction at the determined power level.

According to a further aspect of the present invention, there is provided a method of rendering on a vehicle display system the instantaneous power delivery as a proportion of power capability of a vehicle powertrain. The method comprises receiving data relating to a condition indicative of a limitation on the instantaneous power delivery and/or power capability, determining from the data whether the condition meets at least one predetermined criterion and rendering the limitation in relation to the instantaneous power capability of the powertrain when the condition meets the at least one predetermined criterion.

The method may comprise receiving data relating to more than one condition indicative of a limitation on the instantaneous power delivery and/or power capability and determining from the data whether one or more of the conditions meets at least one respective criterion. The method may further comprise displaying the limitation when at least one of the conditions meets its respective criterion. Alternatively, the limitation may be displayed only when each condition meets its respective criterion.

The limitation may be a temporary limitation indicative of a fault and/or condition of the powertrain causing the speed of the vehicle to be restricted.

The predetermined criterion may be a threshold value, determined from the data, under or over which the limitation is displayed.

The method may be a computer implemented method.

The method comprises selectively displaying the limitation, such that the limitation is not necessarily displayed when present, only when the limitation is considered likely to affect operation of the vehicle, for example due to instantaneous vehicle/powertrain operating parameters.

The condition indicative of a limitation may a speed restriction of the vehicle. The speed restriction being a maximum speed over which the vehicle cannot travel, for example for road safety or vehicle operation reasons. The speed restriction may be implemented by a control system of the vehicle such that the driver is unable to draw further power from the power train when the vehicle is approaching the speed limit and/or a braking force is applied. As such, speed restriction limits power delivery such that, under certain circumstances the powertrain is not able to use/reach the full powertrain capability. The speed restriction need not be a constant speed and may vary depending on one or more operating parameters of the vehicle.

The at least one predetermined criterion may vary in dependence on the instantaneous speed of the vehicle and the processor is configured to determine from the data whether the speed restriction is within a threshold amount of the instantaneous speed of the vehicle. In such embodiments, the input may also be configured to receive data relating to the instantaneous speed of the vehicle.

The speed restriction may vary over time and accordingly the output may be configured to display the limitation at a pre-determined level in dependence on the speed restriction. For example, the predetermined criterion may comprise a threshold speed which is variable in dependence on the speed restriction such that the threshold speed increases as the speed restriction increases. Alternatively, the predetermined criterion comprises a plurality of threshold speeds, and the method comprises selecting an appropriate one of the threshold speeds in dependence on the instantaneous speed restriction.

The display system may comprise an indicator, to render instantaneous power delivery of the powertrain of the vehicle as a proportion of the instantaneous power capability of the powertrain and wherein displaying the limitation includes adding a marker to the indicator indicative of the limitation. The indicator may be a gauge or scale having a lower limit representing zero or negligible power delivery and an upper limit representing maximum power deliver equal to the instantaneous power capability and the marker is positioned between the lower and upper limits.

In embodiments, the method further comprises determining a power level required to maintain the vehicle at a speed corresponding to the speed restriction and the output is configured to display the restriction at the power level.

Embodiments of the invention further include a computer program comprising instructions which, when the program is executed by a computer, cause the computer to carry out the method as described in relation to any of the embodiments described above and a computer-readable data carrier having stored thereon the computer program.

In further embodiments, a vehicle comprises the controller or display system or is configured to perform the method of any of the above-described embodiments. The vehicle may be a battery electric vehicle or hybrid electric vehicle and the powertrain comprises a battery pack and one or more prime-mover, such as an electric motor.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
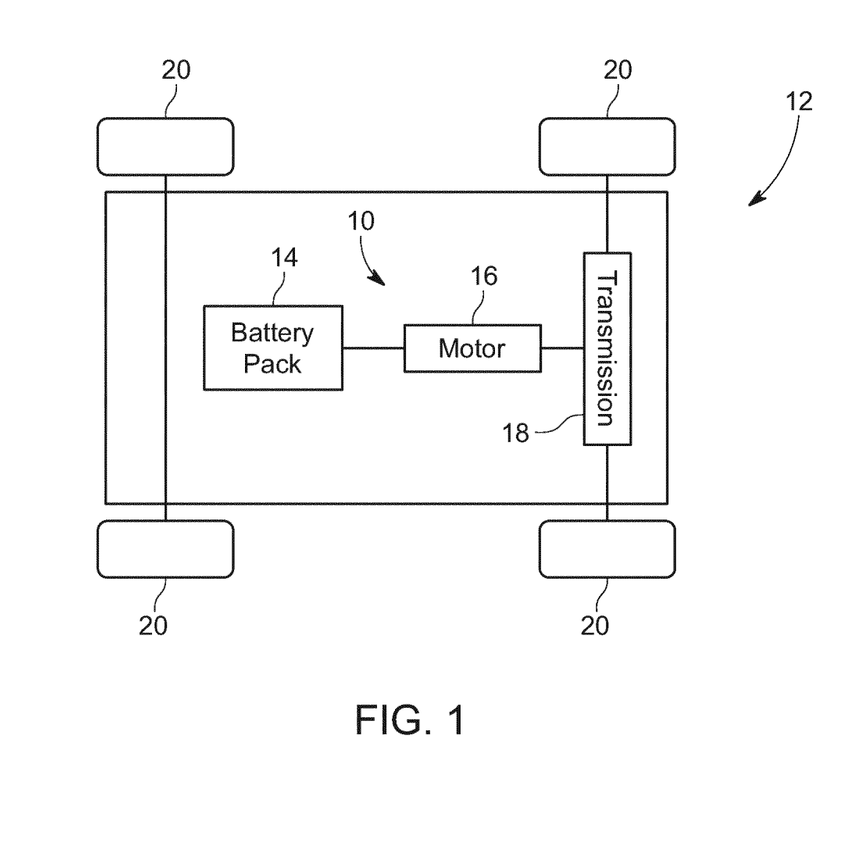
FIG. 1 is a schematic representation of a powertrain of a battery electric vehicle.

FIG. 1 shows an example powertrain 10 of a battery electric vehicle 12. The powertrain 10 includes a battery pack 14 for storing and discharging electrical energy, one or more prime-mover 16 in the form of one or more electric motor for converting the electrical energy into kinetic energy and a transmission 18 for delivering the kinetic energy from the prime-mover 16 to the wheels 20. The transmission 18 may include a clutch, gearbox, differential and fixed gearing as known in the art and will not be discussed in detail here.

In certain situations, such as in regenerative braking for example, kinetic energy may be converted back to electric energy by the motor 16 (acting in reverse as a generator) and stored in the battery pack 14 for later use.

As such, the power delivery from the powertrain 10 may be positive, for example when power is being delivered from the battery pack 14 to the wheels 20 to accelerate the vehicle 12, or negative, for example when power is being delivered to the battery pack 14 from the wheels 20 to decelerate the vehicle 12.

The battery pack 14 may include one or more batteries and associated controllers (not shown). The battery controllers may be used to monitor, inter alia, battery charge level and instantaneous discharge capability of the battery.

The motor 16 may include power electronics and one or more controllers.

The motor 16 may be controlled by a powertrain controller comprising one or more processors configured to receive instructions from the driver via an electronics control unit or ECU (not shown) as is known in the art.

The maximum amount of power available from the powertrain 10, referred to herein as the powertrain capability, may vary according to a number of factors. Such factors may include battery pack and/or motor temperature, motor speed and state of charge of the battery pack. As such the powertrain capability varies dynamically.

It may be desirable to display to the driver an indication of the instantaneous power delivery from the powertrain as a proportion of the instantaneous powertrain capability. Such information may help inform the driver of their driving style and/or improve driving efficiency, for example.

One such system comprises a display including a gauge, visible to the driver of the vehicle. A lower limit of the gauge represents zero or negligible power delivery of the powertrain and an upper limit of the gauge represents the maximum power delivery which is substantially equal to the power capability of the powertrain. A marker positioned between the lower limit and upper limit may represent the instantaneous power delivery as a proportion of the instantaneous power capability.

However, certain situations, such as when one or more of the powertrain components is faulty, or when the vehicle is subject to a speed restriction, may result in an inability to deliver the full powertrain capability rendering the information on the display misleading.

For example, in situations where the battery pack 14 is very cold or very hot the powertrain 10 may not be able to operate as would be predicted. Additionally or alternatively, failure of a high voltage component of the vehicle 12 may cause the vehicle systems to adopt a fault condition in which full power cannot be delivered. For example, this might be caused by the loss of integrity of a high voltage bus or damage to one or more high voltage connectors.

By way of further example, in situations where one or more component of the vehicle 12 is faulty, the vehicle 12 may be configured to adopt a speed restriction as a safety measure and therefore the powertrain 10 may not be able to operate as would be predicted. Additionally or alternatively, the vehicle 12 may be configured to adopt a speed restriction when travelling along one or more routes due to local traffic enforcement requirements. In these embodiments, the powertrain 10 may operate as would be expected at low speeds, below that of the speed restriction, but the powertrain 10 may be disconnected or otherwise unable to generate further power to drive the vehicle 12 as the speed restriction is approached.

The present invention is directed towards a display system for a vehicle which is configured to display instantaneous power delivery of a powertrain of the vehicle as a proportion of the instantaneous power capability of the powertrain. The system is also configured to display an anomalous limitation on the power delivery and/or power train capability, but only when particular criteria are met. The invention thus aims to deliver information to the driver only when it is considered relevant to the driving experience to prevent unnecessary distraction of the driver.

Figure 2:
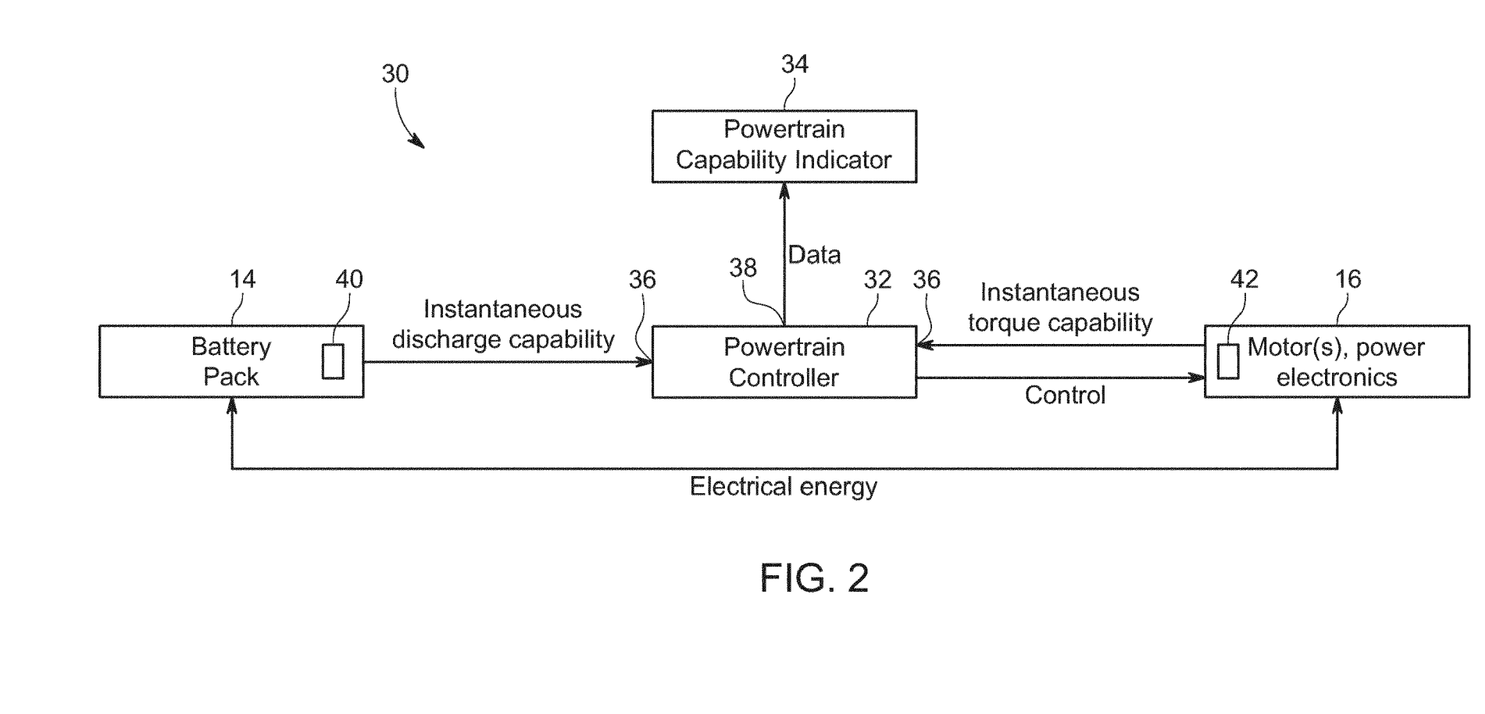
FIG. 2 is a schematic drawing of a vehicle display system according to an embodiment of the invention.

FIG. 2 shows a vehicle display system 30 according to an embodiment of the invention for use in the vehicle 12 of FIG. 1. The illustrated system 30 includes a powertrain controller 32 in functional communication with a powertrain capability indicator 34. The powertrain capability indicator 34 is configured to display the instantaneous power delivery of the powertrain 10 of the vehicle as a proportion of the instantaneous power capability of the powertrain 10. More particularly, the powertrain controller 32 comprises at least one input 36 configured to receive information from the battery pack 14 and motors 16 relating to the instantaneous power delivery of the powertrain 10 and the instantaneous power capability of the powertrain 10. The powertrain controller 32 is further configured to compute the percentage of available power being used by the powertrain 10 at that instant. This information is then transferred, as an output 38, to the powertrain capability indicator 34 to allow for the display of accurate, real-time performance of the powertrain 10.

As described above, the power capability of the power train 10 may vary dynamically in dependence on a number of operating factors thereof. The powertrain controller 32 is therefore configured to receive real-time data relating to these operating factors and select or compute a corresponding instantaneous power capability over a range of possible power capabilities. The powertrain capability indicator 34 is therefore configured to display power delivery as a proportion of this range of power capabilities. This range of power capabilities has an upper limit and lower limit representing expected bounds of operation under a variety of expected operating conditions. The present invention relates to the detecting of conditions in which the power capability of the powertrain 10 is reduced to below the lower limit of this range i.e. below the minimum of the range of power capabilities typically displayed.

In order to do this, the powertrain controller 32 comprises one or more input 36 configured to receive information from the battery pack 14 and/or motors 16. The information comprises data relating to a condition indicative of a limitation on the instantaneous power delivery and/or power capability.

More particularly, in one example the input 36 is configured to receive data from the battery pack 14 indicative of a reduction in available traction power. The reduction in available traction power may be due to a limitation on the discharge capability of one or more of the batteries in the battery pack 14 due to a fault in in one or more electrical components associated with the battery pack 14. A battery pack 14 will typically include a number of high-voltage electrical components associated therewith, such as high-voltage connectors or high voltage buses. Failure of one or more of these components may trigger various safety measures in which the components may be isolated, at least one battery switched off or power may otherwise be prevented from being discharged from the battery pack 14 fully or in part. Other parts of the vehicle 12 having high voltage components, connectors, buses and safety mechanisms, and other parts of the high voltage system are also subject to failure detection and safety mechanisms which may also affect battery discharge. Discharge may also be affected by anomalous conditions of the battery pack 14, for example very low or very high temperatures may cause a number of the components associated with the battery pack 14 to operate ineffectively or may also trigger a safety response limiting the power the battery pack 14 is able to discharge. A controller 40 associated with the battery pack is configured to deliver information relating to this limiting condition to the powertrain controller 32 for processing.

The input 36 is also configured to receive data from the motors 16 indicative of a reduction in available traction torque from the motors 16 and the instantaneous speed of the motors 16, i.e. the rotational speed of the motors 16. A reduction in available traction torque may be the result of a failure or one or more components in a similar manner as described above. A controller 42 associated with the motors 16 is configured to deliver information relating to this limiting condition to the powertrain controller 32 for processing. The motor controller 42 is further configured to deliver information relating to the speed of the motors 16 to the powertrain controller 32.

In another example, the input 36 is configured to receive data from the motors 16 indicative of a speed limitation of the vehicle 12 and the instantaneous speed of the vehicle 12. A controller 42 associated with the motors 16 and associated power electronics is configured to deliver information relating to this limiting condition to the powertrain controller 32 for processing. The motor controller 42 is further configured to deliver information relating to the speed of the vehicle 12 to the powertrain controller 32.

The powertrain controller 32 comprises at least one processor (not shown) configured to receive the above described data from the input 36 and decide whether the limitation should be displayed to a driver of the vehicle 12. More particularly, the processor is configured to decide, from the data, whether the limiting condition (i.e. the reduction of available traction power and/or reduction in available traction torque, or the speed restriction) meets one or more predetermined criterion. The one or more predetermined criterion is set such that the limiting condition is only displayed when the power capability is below the minimum of the range of power capabilities typically displayed by the powertrain capability indicator 34. Moreover, the predetermined criterion is set such that the limiting condition is only displayed to the driver when it is considered likely that the condition would affect the present driving experience.

For example, when a reduction in available traction power is detected, as described above, the processor is configured to determine if the available traction power is below a predetermined threshold power value. The predetermined threshold power value represents the minimum power capability that is displayable by the powertrain capability indicator 34.

The processor is further configured such that, when detecting that the available traction power is below the predetermined threshold power value, the processor computes a ratio of the available power over the threshold value, referred to herein as the power ratio. The processor is configured to determine whether the power ratio is below a predetermined power ratio threshold. The power ratio threshold represents a condition in which the reduction in available traction power would be noticeable by the driver i.e. it would noticeably affect the driving experience.

Additionally, when a reduction in available traction torque is detected, as described above, the processor is configured to determine if the available traction torque is below a predetermined threshold value. The predetermined threshold value represents the minimum power capability that is displayable by the powertrain capability indicator 34. In this case, the predetermined threshold value varies in dependence on the speed of one or more of the motors of the powertrain.

The processor is further configured such that, when detecting that the available traction torque is below the predetermined threshold, the processor computes a ratio of the available torque over the threshold value, referred to herein as the torque ratio. The processor is configured to determine whether the torque ratio is below a predetermined torque ratio threshold. In a similar manner to above, the torque ratio threshold represents a condition in which the reduction in available traction torque would be noticeable by the driver i.e. it would noticeably affect the driving experience. The main difference being that, in the case of a reduction in torque, the condition is only likely to be noticeable by the driver when the motors are operating at particular speeds. This is represented by the speed dependent torque threshold.

More particularly, the difference between power limitation and torque limitation, with respect to speed, is that a power limitation results in a reduction in delivered torque only at higher motor speeds, such that the reduction is noticeable only at higher speeds. The speed at which it the limitation becomes noticeable is dependent on the magnitude of the power reduction. However, the available torque is typically lower at higher speeds in normal conditions, and reductions in actuator torque availability are usually scaled from the normal speed-dependent limits. As such, actuator torque limitations typically take effect at all motor speeds.

As such, in this example the processor is configured to determine three types of conditions. A first condition where there is no limitation, a second condition where an absolute value of the limitation (i.e. available power or torque) is below a first threshold value but the ratio of the limitation over the first threshold value is not below a second, ratio threshold and a third condition where the absolute value of the limitation is below a first threshold value and a ratio of the limitation over the first threshold value is below the second, ratio threshold.

In another example, when a speed restriction is detected, as described above, the processor is configured to determine if the available traction power is below a predetermined threshold value. The predetermined threshold value varies in dependence on the current vehicle speed. More particularly, the threshold value is determined as a function of the current vehicle speed such that it is sufficiently close to the current vehicle speed that the vehicle may approach the speed restriction.

As such, in this example, the processor is configured to determine two (rather than three, as per the previous example) types of conditions. A first condition where there is no limitation and a second condition where an absolute value of the limitation (i.e. the speed limitation) is below a threshold value.

The powertrain controller output 38 is configured to deliver data relating to the limitation to the powertrain capability indicator 34 for display thereon. More particularly, the powertrain controller output 38 is configured to deliver data indicative of the first, second or third condition as described above.

The powertrain capability indicator 34 is configured to display the first, second (or third) condition in dependence on the received output 38. More particularly, when receiving data indicative of the first condition, the powertrain capability indicator 34 is configured to display the instantaneous power delivery of the powertrain 10 as a proportion of the instantaneous power capability in the normal manner.

In the example of three conditions, when receiving data from the output of the powertrain controller 32 indicative of the second condition, the powertrain capability indicator 34 is configured to display the instantaneous power delivery of the powertrain 10 as a proportion of an adjusted power indication. The adjusted power indication $C_a$ being calculated as follows:

$$C_a = P_d * (P_a/P_t)$$

where $P_d$ is the instantaneous power delivery, $P_a$ is the instantaneously available power/torque of the powertrain 10 and $P_t$ is the predetermined threshold as described above. The adjusted power indication $C_a$ may be calculated by the powertrain controller 32, by a processor of the powertrain controller 32, or by a processor of the powertrain capability indicator (not shown).

When receiving data indicative of the third condition, the powertrain capability indicator 34 is configured to add a marker to the display indicative of a limitation. More particularly, the powertrain capability indicator 34 is configured to add a marker onto a scale or gauge of the indicator display at a position representative of the ratio ($P_a/P_t$).

In the example of two conditions, when receiving data from the output of the powertrain controller 32 indicative of the second condition (an absolute value of the limitation is below a threshold value), the powertrain capability indicator 34 is configured to add a marker to the display indicative of a limitation. More particularly, the powertrain capability indicator 34 is configured to add a marker onto a scale or gauge of the indicator display at a position representative of the power limit at which the speed restriction is likely to be met and therefore the power limit at which the powertrain likely to be disengaged to prevent the vehicle from exceeding the speed restriction. The power limit and/or position of the marker may be determined by the processor of the powertrain controller 32 or by a processor of the powertrain capability indicator 34.

The powertrain capability indicator comprises a display which may take any form of visual output as known in the art. For example, the display may take the form of a gauge such as a circular or part-circular gauge, pie chart, a linear gauge comprising a moving bar. Additionally or alternatively the display may present the output as one or more numbers, for example a percentage and/or fraction. Other graphical representation of the data may be used additionally or alternatively and may be defined by colour, hue, shading, crosshatching, shapes, patterns etc. The display may show the information digitally on a screen and/or may comprise one or more mechanical dials.

Figure 3A:
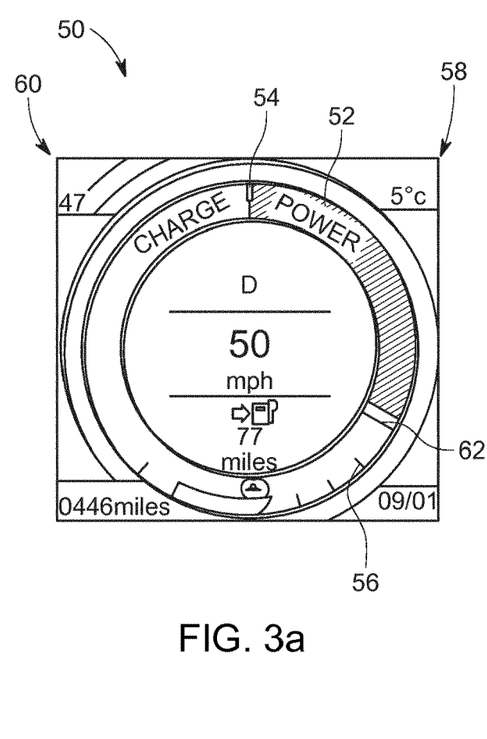
FIGS. 3a-c show an example display for a vehicle configured to display instantaneous power delivery of a powertrain of the vehicle as a proportion of the instantaneous power capability of the powertrain.
Figure 3B:
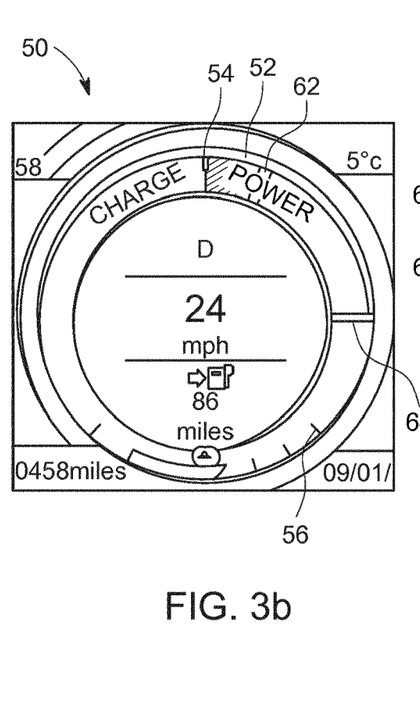
Figure 3C:
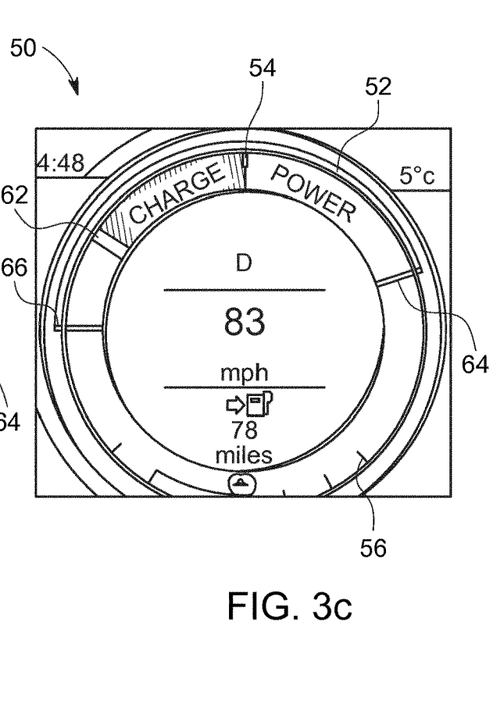

FIGS. 3a-c show an example display 50 for the powertrain capability indicator 34 described above and configured to display instantaneous power delivery of the powertrain 10 of the vehicle 12 as a proportion of the instantaneous power capability of the powertrain 10. The display 50 is disposed within the interior of the vehicle 12 to be visible by the driver or occupant of the vehicle 12.

The display includes an arcuate gauge 52 having a lower limit 54 representing zero or negligible power delivery by the powertrain 10 and an upper limit 56 representing maximum power delivery by the powertrain 10 equal to the instantaneous power capability. The gauge 52 has a positive side 58 for when the vehicle 12 is operating in a power mode i.e. power is being drawn from the powertrain 10 and a negative side 60 for when the vehicle 12 is operating in a charge mode i.e. power is being provided to the powertrain 10, for example during regenerative braking.

FIG. 3a shows the display 50 when the instantaneous power delivery close to its maximum i.e. approaching the instantaneous power capability. The display 50 comprises a power delivery marker 62 that moves around the gauge 52 in dependence on the instantaneous power delivery of the powertrain 10. FIG. 3*a* shows the powertrain 10 in either the first or second condition as described above i.e. either there is no powertrain limitation or the limitation is not considered sufficient to affect the driving experience and be noticeable by the driver. As such, no limitation is displayed.

FIG. 3*b* shows the display 50 when the instantaneous power delivery is lower than in FIG. 3*a*. More particularly, the instantaneous power delivery is greater than zero and less than the instantaneous power capability. In this example the instantaneous power delivery is less than one quarter of the instantaneous power capability as represented by the position of the delivery marker 62. In relation to the example of three conditions, FIG. 3*b* shows the powertrain 10 in the third condition as described above, i.e. the powertrain limitation is considered sufficient to affect the driving experience and be noticeable by the driver. As such, a limitation marker 64 is also present on the gauge 52 to represent the powertrain limitation.

In relation to the example of two conditions, FIG. 3*b* shows the powertrain 10 in the second condition as described above, i.e. the speed restriction is within a predetermined margin of the current speed and is considered likely to affect the driving experience and be noticeable by the driver if more power is demanded. As such, a limitation marker 64 is also present on the gauge 52 to represent the potential limitation on power should the drive attempt to demand more power from the powertrain 10.

FIG. 3*c* shows the display 50 when the instantaneous power delivery is negative i.e. the vehicle 12 is operating in a charge mode. As with FIG. 3*b*, FIG. 3*c* also shows the powertrain 10 in the third condition (for the three condition example) or second condition (for the two condition example) as described above, however in this example the powertrain limitation is also limiting the charging of the battery pack 14. As such, a further limitation marker 66 is present on the gauge 52 to represent the charging limitation.

Figure 4:
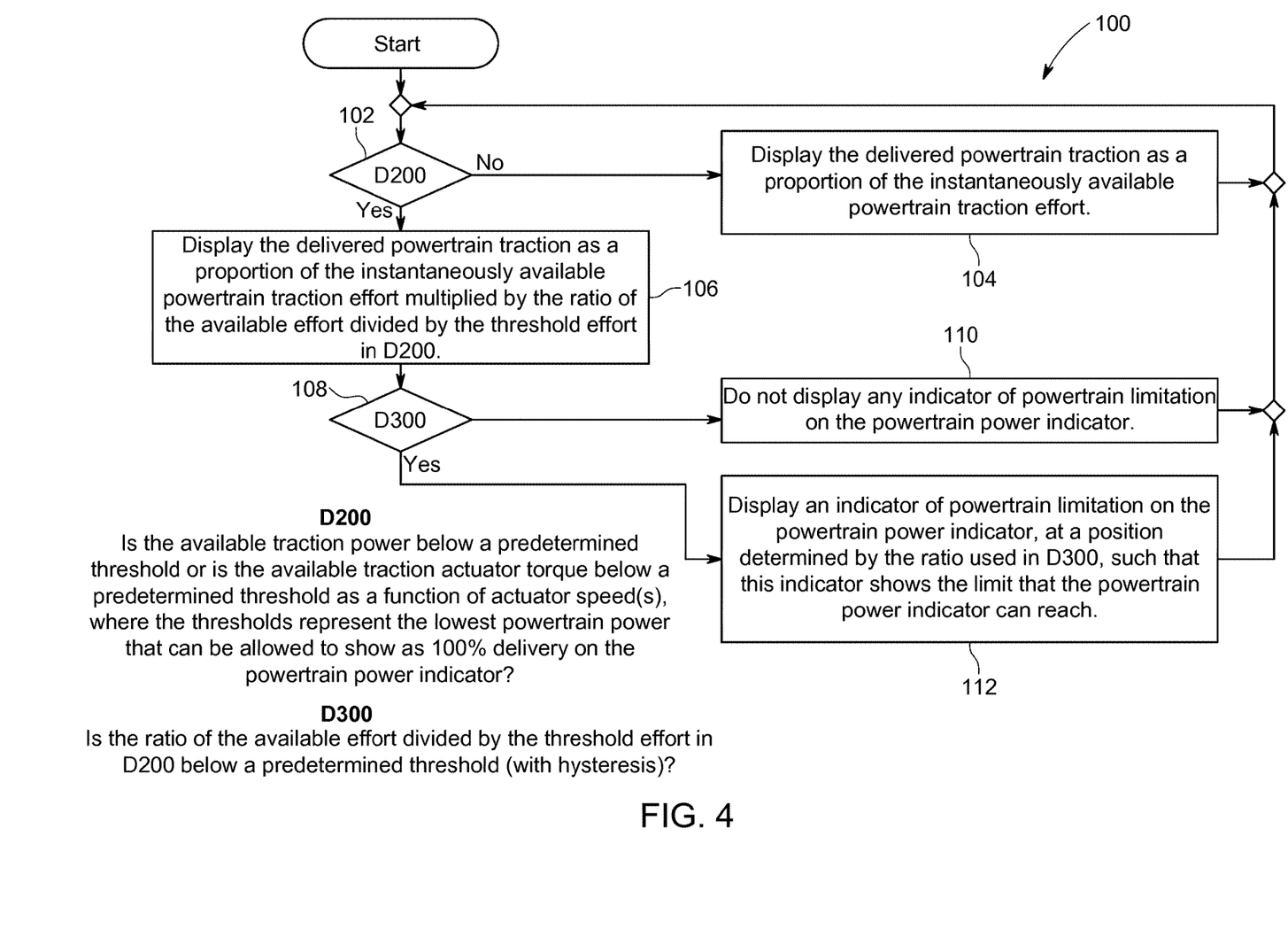
FIG. 4 is a flow diagram showing a first method of selectively displaying a powertrain limitation in accordance with an embodiment of the invention.

FIG. 4 is a flow diagram showing a first method 100 of rendering on a vehicle display system the instantaneous power delivery as a proportion of power capability in which a powertrain limitation is selectively displayed in accordance with an embodiment of the invention.

At step 102, it is determined whether the available traction power is below a predetermined threshold or whether the available traction actuator torque is below a predetermined threshold, the predetermined threshold for available traction actuator torque being a function of actuator speed. As described above, the predetermined threshold in either case represent a condition in which the instantaneous power capability is below the range of power capabilities typically displayed by the powertrain capability indicator.

If neither the available traction power nor the available traction actuator torque is below its respective threshold then the method proceeds to step 104 in which the vehicle display continues to show the instantaneous power delivery as a proportion of the instantaneous power capability.

However, if either the available traction power or the available traction actuator torque is below its respective threshold then the method proceeds to step 106. At step 106 the instantaneous power delivery is displayed however this is displayed as a proportion of an adjusted indication $C_a$. The adjusted power indication $C_a$ being calculated as follows:

$$C_a = P_d * (P_d/P_t)$$

where $P_d$ is the instantaneous power delivery, $P_a$ is the instantaneously available traction power of the powertrain and $P_t$ is the predetermined threshold.

The method then proceeds to step 108 in which it is determined if the ratio of the available of the available traction power over the predetermined threshold ($P_d/P_t$) is itself below a predetermined ratio threshold. The ratio threshold representing a condition in which the limitation is likely to noticeably affect the driving experience.

If the ratio is not below the ratio threshold the method then continues to step 110 and no limitation if displayed on the powertrain power indicator.

If the ratio is below the ratio threshold, the method continues to step 112 in which the limitation is displayed on the display system. More particularly, the limitation is marked onto a scale or gauge of the display at a position representative of the ratio ($P_d/P_t$).

Figure 5:
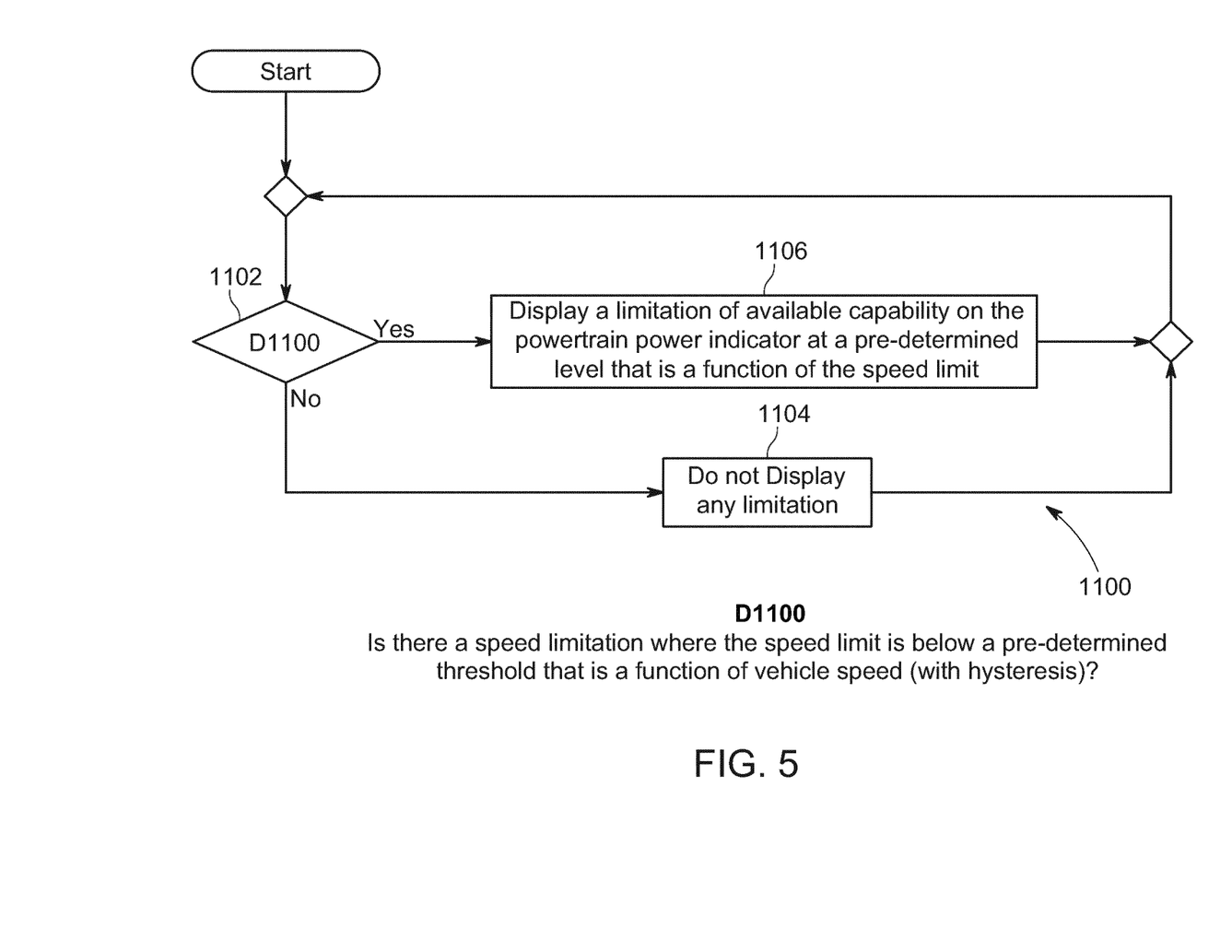
FIG. 5 is a flow diagram showing a second method of selectively displaying a powertrain limitation in accordance with an embodiment of the invention.

FIG. 5 is a flow diagram showing a second method 1100 of rendering on a vehicle display system the instantaneous power delivery as a proportion of power capability in which a powertrain limitation is selectively displayed in accordance with an embodiment of the invention.

At step 1102, it is determined whether the there is a speed restriction and whether the speed restriction is below a predetermined threshold, the predetermined threshold for available traction actuator torque being a function of the current vehicle speed. As described above, the predetermined threshold represents a condition in which the powertrain is likely to be disconnected if further power is requested.

If the speed restriction is above the threshold value then the method proceeds to step 1104 in which the vehicle display continues to show the instantaneous power delivery as a proportion of the instantaneous power capability and no limitation is displayed.

If the speed restriction is below the threshold the method continues to step 1106 in which the limitation is displayed on the display system. More particularly, the limitation is marked onto a scale or gauge of the display at a position representative of the power at which the speed restriction is likely to be met.

Figure 6:
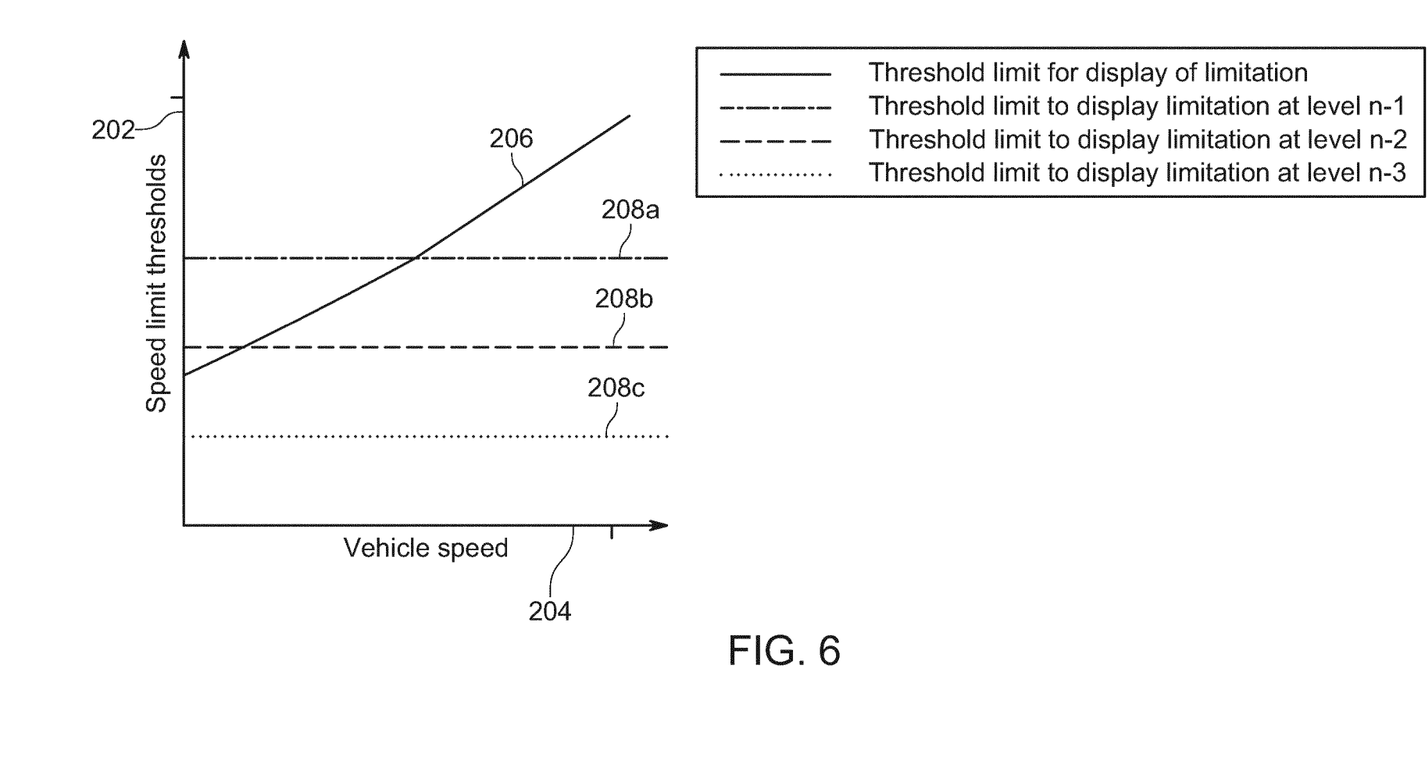
FIG. 6 is a graph showing how the speed limit thresholds may vary with vehicle speed in accordance with various embodiments of the invention.

FIG. 6 is a graph 200 showing how the speed limit threshold 202 may vary with vehicle speed 204 in accordance with various embodiments of the invention. In one embodiment, the speed limit threshold 202 is represented by a first line 206. The first line 206 shows the threshold 202 increasing linearly with vehicle speed 204 such that the speed limit threshold 202 will be higher at higher vehicle speed 204. Although the illustrated embodiment shows a linear relationship between the threshold 202 and vehicle speed 204, it will be appreciated that other relationships i.e. where the line 206 comprises one or more curves or lines of differing gradient.

In a further embodiment, the speed limit threshold may be selected from one of a plurality of fixed threshold speeds represented by the lines 208*a-c*. One of the threshold speeds is selected in dependence on the current vehicle. For example, when the current vehicle speed is within a first range then the first speed limit threshold 208*a* is selected, when the current vehicle speed is within a second range then the second speed limit threshold 208*b* is selected and when the current vehicle speed is within a third range then the third speed limit threshold 208*c* is selected. Although the illustrated embodiment shows three fixed speed limit thresholds 208*a-c*, it will be appreciated that any number of fixed speed limit thresholds could be determined, each threshold being selected when the current vehicle speed is within an associated range.

In all the embodiments described above, the predetermined thresholds include a certain degree of hysteresis to prevent flickering of the display when the conditions remain close to the threshold.

Although the present invention is described in relation to a battery electric vehicle (BEV), it will be appreciated that the present invention may be also application to hybrid electric vehicles and internal combustion engines.

Many modifications may be made to the above examples without departing from the scope of the present invention as defined in the accompanying claims.

The invention claimed is:

1. A controller for a vehicle display system, the display system configured to display instantaneous power delivery of a powertrain of the vehicle as a proportion of the instantaneous power capability of the powertrain, the controller comprising:
   an input configured to receive data relating to a condition indicative of a limitation on either or both of the instantaneous power delivery and power capability;
   a processor configured to determine from the data whether the condition meets at least one predetermined criterion; and
   an output configured to output a signal to display the limitation in relation to the instantaneous power capability of the powertrain when the condition meets the at least one predetermined criterion.

2. A vehicle comprising the controller of claim 1.

3. The controller of claim 1, wherein the condition indicative of a limitation includes a reduction in available traction power.

4. The controller of claim 3, wherein the reduction in available traction power is due to a limitation on the discharge capability of a battery of the powertrain.

5. The controller of claim 3, wherein the processor is configured to determine from the data whether the available traction power is below a predetermined magnitude.

6. The controller of claim 1, wherein the condition indicative of a limitation is a reduction in available traction torque from one or more prime-mover of the powertrain.

7. The controller of claim 6, wherein the processor is configured to determine whether the available traction torque is below a predetermined magnitude.

8. The controller of claim 7, wherein the predetermined magnitude is variable based at least in part on the instantaneous speed of one or more prime-movers of the vehicle.

9. The controller of claim 1, wherein the power capability of the powertrain varies based on one or more operating parameters thereof and the display system is configured to display power delivery as a proportion of a range of power capabilities, the predetermined criterion representing the instantaneous power capability being below the minimum of the range of power capabilities.

10. The controller of claim 9, wherein the processor is configured to determine a ratio of the instantaneous power capability to the minimum of the range of power capabilities and the output is configured to display the ratio.

11. The controller of claim 1, wherein the condition indicative of a limitation is a speed restriction of the vehicle.

12. The controller of claim 11, wherein the at least one predetermined criterion is variable with the instantaneous speed of the vehicle and the processor is configured to determine from the data whether the speed restriction is within a threshold amount of the instantaneous speed of the vehicle.

13. The controller of claim 11, wherein the speed restriction is variable with time and the output is configured to display the limitation at a pre-determined level in dependence on the instantaneous speed restriction.

14. The controller of claim 13, wherein the predetermined criterion comprises a threshold speed which is variable with the instantaneous vehicle speed such that the threshold speed increases as the vehicle speed increases.

15. The controller of claim 13, wherein the predetermined criterion comprises a plurality of threshold speeds, and wherein the processor is configured to select one of the threshold speeds based at least in part on the instantaneous vehicle speed.

16. A display system for a vehicle, the display system configured to display instantaneous power delivery of a powertrain of the vehicle as a proportion of the instantaneous power capability of the powertrain and comprising a controller as set forth in claim 1.

17. The display system of claim 16, wherein the display system comprises an indicator to graphically display instantaneous power delivery of the powertrain of the vehicle as a proportion of the instantaneous power capability of the powertrain and wherein the output is configured to add a marker to the indicator indicative of the limitation.

18. The display system of claim 17, wherein the processor is configured to determine a power level required to maintain the vehicle at a speed corresponding to the speed restriction and the output is configured to display the restriction at the determined power level.

19. A method of rendering on a vehicle display system the instantaneous power delivery as a proportion of power capability of a vehicle powertrain, the method comprising:
   receiving data relating to a condition indicative of a limitation on either or both of the instantaneous power delivery and power capability;
   determining from the data whether the condition meets at least one predetermined criterion; and
   rendering the limitation in relation to the instantaneous power capability of the powertrain when the condition meets the at least one predetermined criterion.

20. A non-transitory, computer-readable storage medium storing instructions thereon that, when executed by one or more electronic processors, causes the one or more electronic processors to carry out the method of claim 19.

* * * * *